(12) United States Patent
Desch (10) Patent No.: US 7,202,915 B2
(45) Date of Patent: Apr. 10, 2007

(54) SYSTEMS, METHODS, AND APPARATUS FOR SIMULTANEOUS VIEWING OF DIFFERING VIDEO PROGRAM SOURCES

(75) Inventor: David Alan Desch, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 606 days.

(21) Appl. No.: 10/695,476

(22) Filed: Oct. 27, 2003

(65) Prior Publication Data

US 2004/0087348 A1 May 6, 2004

Related U.S. Application Data

(62) Division of application No. 09/183,717, filed on Oct. 30, 1998, now abandoned.

(51) Int. Cl.
*H04N 5/44* (2006.01)
(52) U.S. Cl. .................. 348/725; 348/731; 348/726
(58) Field of Classification Search ................ 348/725, 348/726, 731–733, 553–558; 375/316; 725/151
See application file for complete search history.

(56) References Cited

U.S. PATENT DOCUMENTS

| | | | |
|---|---|---|---|
| 3,961,324 A | 6/1976 | Cousin et al. |
| 4,422,093 A | 12/1983 | Pargee, Jr. |
| 4,893,248 A | 1/1990 | Pitts et al. |
| 5,045,947 A | 9/1991 | Beery |
| 5,068,734 A | 11/1991 | Beery |
| 5,237,610 A | 8/1993 | Gammie et al. |
| 5,257,106 A | 10/1993 | Maruoka |
| 5,327,554 A | 7/1994 | Palazzi, III et al. |
| 5,416,534 A | 5/1995 | Hayashi et al. |
| 5,453,758 A | 9/1995 | Sato |
| 5,528,304 A | 6/1996 | Cherrick et al. |

(Continued)

OTHER PUBLICATIONS

Dr. Thomas Sikora, MPEG Digital Video-Coding Standards; IEEE Signal Processing Magazine, Sep. 1997, pp. 82-99.

(Continued)

*Primary Examiner*—Michael H. Lee
(74) *Attorney, Agent, or Firm*—Blakely, Sokoloff, Taylor & Zafman LLP (57) ABSTRACT

One aspect of the present invention relates to a system and method for selecting the sources of at least two shows capable of being received and displayed by an entertainment system. The user selects for viewing, a first show associated with a first channel from a first source. The first show is then displayed. The user also selects for viewing, a second show associated with a second channel from any one of the first and a second sources. The second show is then displayed. A second aspect of the present invention relates to a system and method for selecting the sources of at least two shows capable of being received and displayed by an entertainment system. The user selects for viewing, a first show associated with a first channel from a first source. The first show is displayed on a first portion of a display screen. The user also selects for viewing, a second show associated with a second channel from any one of the first and a second sources. The second show is simultaneously displayed on a second portion of the display screen.

10 Claims, 7 Drawing Sheets

U.S. PATENT DOCUMENTS

| | | |
|---|---|---|
| 5,596,373 A | 1/1997 | White et al. |
| 5,801,787 A | 9/1998 | Schein et al. |
| 5,808,694 A | 9/1998 | Usui et al. |
| 5,828,945 A | 10/1998 | Klosterman |
| 5,900,916 A | 5/1999 | Pauley |
| 5,903,314 A | 5/1999 | Niijima et al. |
| 5,926,230 A | 7/1999 | Niijima et al. |
| 5,936,667 A * | 8/1999 | Saib et al. .................. 348/180 |
| 5,956,094 A | 9/1999 | Chun |
| 5,969,769 A | 10/1999 | Hamadate |
| 5,982,411 A | 11/1999 | Eyer et al. |
| 5,990,883 A | 11/1999 | Byrne et al. |
| 6,003,041 A | 12/1999 | Wugofski |
| 6,005,562 A * | 12/1999 | Shiga et al. ................ 715/721 |
| 6,005,937 A | 12/1999 | Lee |
| 6,020,930 A | 2/2000 | Legrand |
| 6,026,506 A * | 2/2000 | Anderson et al. ........... 714/746 |
| 6,037,998 A | 3/2000 | Usui et al. |
| 6,049,830 A | 4/2000 | Saib |
| 6,075,570 A | 6/2000 | Usui et al. |
| 6,097,878 A | 8/2000 | Saib |
| 6,104,908 A | 8/2000 | Schaffner et al. |
| 6,133,962 A | 10/2000 | Proehl et al. |
| 6,163,345 A | 12/2000 | Noguchi et al. |
| 6,243,142 B1 | 6/2001 | Mugura et al. |
| 6,292,624 B1 | 9/2001 | Saib et al. |
| 6,424,791 B1 | 7/2002 | Saib |
| 6,426,779 B1 | 7/2002 | Noguchi et al. |
| 6,483,553 B1 * | 11/2002 | Jung ......................... 348/731 |
| 6,505,346 B2 | 1/2003 | Saib et al. |
| 6,518,986 B1 | 2/2003 | Mugura |

OTHER PUBLICATIONS

Stanley N. Baron, Mark I. Kricocheev; Digital Image and Audio Communications.

S. Merrill Weiss; Issues in Advanced Television Technology.

* cited by examiner

SYSTEMS, METHODS, AND APPARATUS FOR SIMULTANEOUS VIEWING OF DIFFERING VIDEO PROGRAM SOURCES

CROSS REFERENCE TO RELATED APPLICATIONS

This application claims the benefit and is a divisional of application Ser. No. 09/183,717, filed Oct. 30, 1998 now abandoned by David Alan Desch.

BACKGROUND OF THE INVENTION

1. Field of the Invention

The present invention relates to a system and method for providing digital video and audio broadcasts.

2. Description of Art Related to the Invention

Over the last few years, there has been a growing demand for entertainment systems working in conjunction with various types of broadcasting systems. One type of entertainment system includes a broadcast satellite system; namely, a digital satellite system (DSS). The DSS typically comprises an antenna, an integrated receiver decoder (IRD) and a television receiver (TV). In addition, the DSS may include an analog video cassette recorder (VCR) that receives analog data for recording purposes. The operations of the IRD are controlled by a remote control.

The antenna receives digital bit streams from a satellite and routes the digital bit streams to the IRD. Typically, a digital bit stream includes sensory data (e.g., video and/or audio) and programming data for one or more shows. Existing DSS receivers are incompatible with terrestrially-broadcast local stations because the DSS antenna and existing television antennas or television cable systems are entirely different in design.

Recent advances by Sony Corporation has resulted in the introduction of an analog NTSC-based television having an input for receiving cable-based broadcasts and a separate input for receiving local, cabled-based and/or terrestrial-based digital broadcasts. As a result, the consumer may select to view DSS channels and local/terrestrial/cable-based channels through the use of a single DSS system by selecting the appropriate input on the television. However, such a system does not enable the user to surf through the channels from the two different broadcast sources in a seamless manner. The user has to first select the source and then select from among the channels available from that particular source. In addition, such a system does not permit the simultaneously viewing of more than one program from digitally encoded source or sources.

Accordingly, there is a need in the technology for a method and apparatus for facilitating seamless channel surfing or viewing of programs provided from at least two different sources. In addition, there is a need in the technology for simultaneously viewing of programs from more than one source. As a result, the consumer's viewing choices may be maximized.

SUMMARY OF THE INVENTION

One aspect of the present invention relates to a system and method for selecting the sources of at least two shows capable of being received and displayed by an entertainment system. The user selects for viewing, a first show associated with a first channel from a first source. The first show is then displayed. The user also selects for viewing, a second show associated with a second channel from any one of the first and a second sources. The second show is then displayed. A second aspect of the present invention relates to a system and method for selecting the sources of at least two shows capable of being received and displayed by an entertainment system. The user selects for viewing, a first show associated with a first channel from a first source. The first show is displayed on a first portion of a display screen. The user also selects for viewing, a second show associated with a second channel from any one of the first and a second sources. The second show is simultaneously displayed on a second portion of the display screen.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In one embodiment, the present invention relates to a system and method for providing seamless viewing of programs provided from at least two different sources. In one embodiment, the sources may include a satellite broadcasting station, a cable programming station and one or more local programming stations. The sources may be either digital (Advanced Television Systems Committee (ATSC) compliant) or and/or (National Television Systems Committee (NTSC) compliant). In one embodiment, each of the stations may modulate the corresponding broadcast signals using any modulation techniques, including: amplitude modulation, frequency modulation or frequency shift keying, and phase modulation. The present invention also provides simultaneously display and/or recording of programs from two different sources.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. Stored within the system, "timer data" includes programming data of shows scheduled to be recorded and programming data of shows chosen by the user to be entered into timer memory but are not scheduled to be recorded. Timer data may further include programming data of shows that have been purchased for viewing. While certain illustrative embodiments are described in order to convey the spirit and scope of the present invention, such embodiments should not be construed as a limitation on the scope of the present invention.

Figure 1:
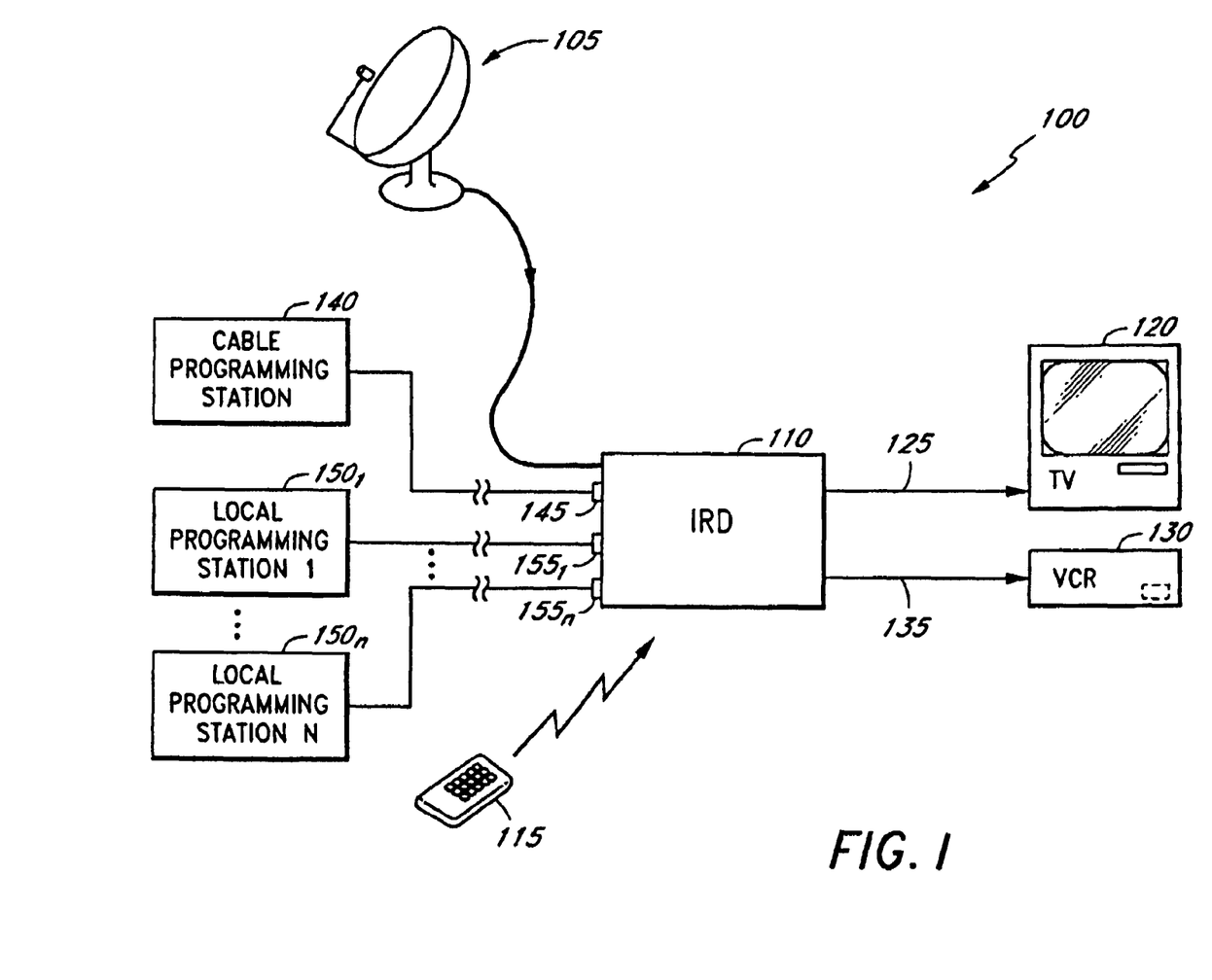
FIG. 1 is an illustrative embodiment of an entertainment system utilizing the present invention.

Referring to FIG. 1, one embodiment of an entertainment system utilizing the present invention is shown. The entertainment system 100 comprises an antenna 105, a broadcast receiver 110 such as an integrated receiver decoder (IRD) for example, and at least one analog-input peripheral device (e.g., a display monitor such as television receiver "TV" 120 and/or an analog recording device 130 such as a video cassette recorder "VCR"). In an alternate embodiment, the components (i.e., antenna 105, broadcast receiver 110, TV 120 and VCR 130) may be combined within a single TV receiver. The broadcast receiver 110 also comprises an input port 145 that receives broadcast signals from a programming station 140, such as a cable television station. The broadcast receiver 110 further comprises one or more input ports $155_1$–$155_n$ each of which receives broadcast signals from a corresponding local programming (terrestrial) station $150_1$–$150_n$.

The broadcast receiver 110, in general, receives a broadcast signal (a digital bit stream for example, from the antenna 105, digital data from the cable programming station 140, and digital and/or analog signal information from each of the programming stations $150_1$–$150_n$), and performs operations on the broadcast signal to produce digital and/or analog information. In one embodiment, the satellite broadcasting station (not shown), the cable programming station 140 and the local programming stations $150_1$–$150_n$ may modulate the corresponding broadcast signals using any modulation technique, including, but not limited to: amplitude modulation, for example, Quadrature Amplitude Modulation (QAM); frequency modulation or frequency shift keying, for example, Quaternary Phase Shift Keying (QPSK) and Vestigial Sideband (VSB) shift keying; and phase modulation, for example, Phase Shift Keying (PSK) and Differential Phase Shift Keying (DPSK). By way of example, the satellite broadcasting station may modulate the broadcast signals using QPSK prior to transmission of the corresponding signals; the cable programming station 140 may modulate the broadcast signals using QAM prior to transmission of the corresponding signals; while the local programming stations may modulate the broadcast signals using VSB prior to transmission of the corresponding signals. Although the IRD 110 is implemented as the broadcast receiver in this embodiment, other types of broadcast receivers may be used such as a cable box for a Cable Broadcasting System, an Internet terminal, a digital satellite system (DSS) computer, a combined digital television receiver and the like.

Antenna 105 receives the digital bit stream from an orbiting satellite or a satellite broadcasting station (not shown) and routes the bit stream to IRD 110. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

IRD 110 is responsible for: decoding the digital bit stream from antenna 105, decoding the digital and/or analog signals from the cable programming station 140 and/or decoding the digital and/or analog signals from the local programming stations $150_1$–$150_n$; for storing channel source data in memory accessible by channel source software executed by IRD 110; and for processing the decoded bit stream or analog data to produce one or more output signals having appropriate formats. As shown, an output signal is placed in an analog format and sent via communication line 125 to TV 120 for viewing, and/or via communication line 135 to the recording device 130 (such as a VCR) for recording. The analog format may be in accordance with a video format established by National Television Systems Committee (NTSC), or other video formats, including but not limited or restricted to: Phase Alternating Line (PAL), Sequential Couleur Avec Memoire (SECAM) and other recognized formats.

Figures 3, 3A:
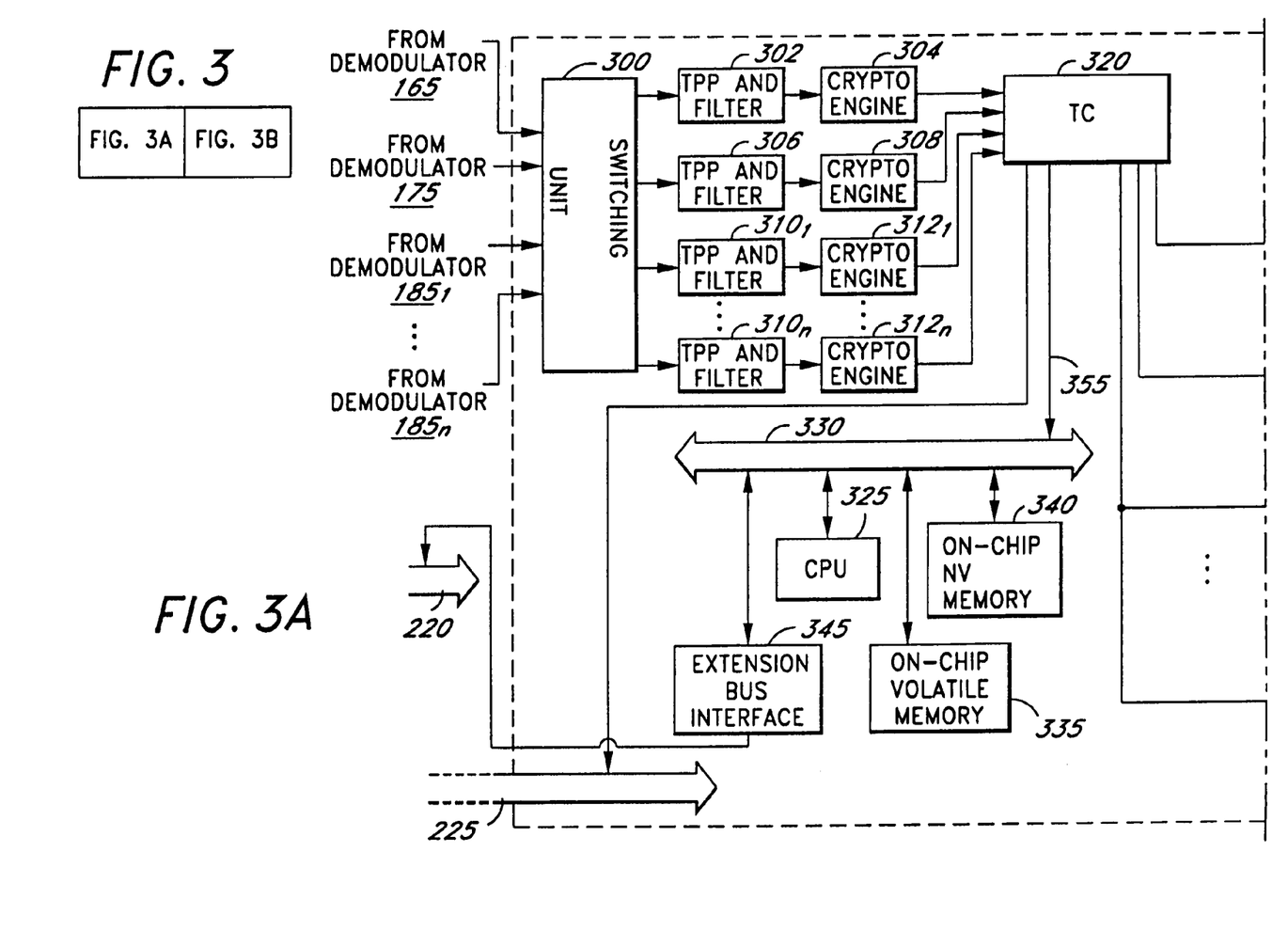
FIGS. 3A and 3B illustrate a detailed block diagram of one embodiment of the main decoder, graphics processing and OSD unit implemented within the integrated receiver decoder of FIG. 2.

Additionally, IRD 110 is responsible for responding to a plurality of commands from a remote control 115. Remote control 115 may include any type of remote control, including one described in U.S. Pat. No. 5,453,758 assigned to Sony Corporation of Tokyo, Japan. Examples of commands from remote control 115 include a first command causing IRD 110 to produce an output signal displaying at least an electronic guide screen on TV 120. Likewise, a second command causes IRD 110 to produce another output signal displaying a channel selection menu 400 (see FIGS. 3 and 4) that is superimposed on the electronic guide screen. The channel selection menu 400 facilitates selection of the channel source for a predetermined number of channels. The channel selection menu includes a number of option grids as shown in FIGS. 3 and/or 4. Upon scrolling the channel selection menu to a selected option grid and initiating a third command from the remote control 115, the user may enter the desired channel source into memory as discussed below.

Figure 2:
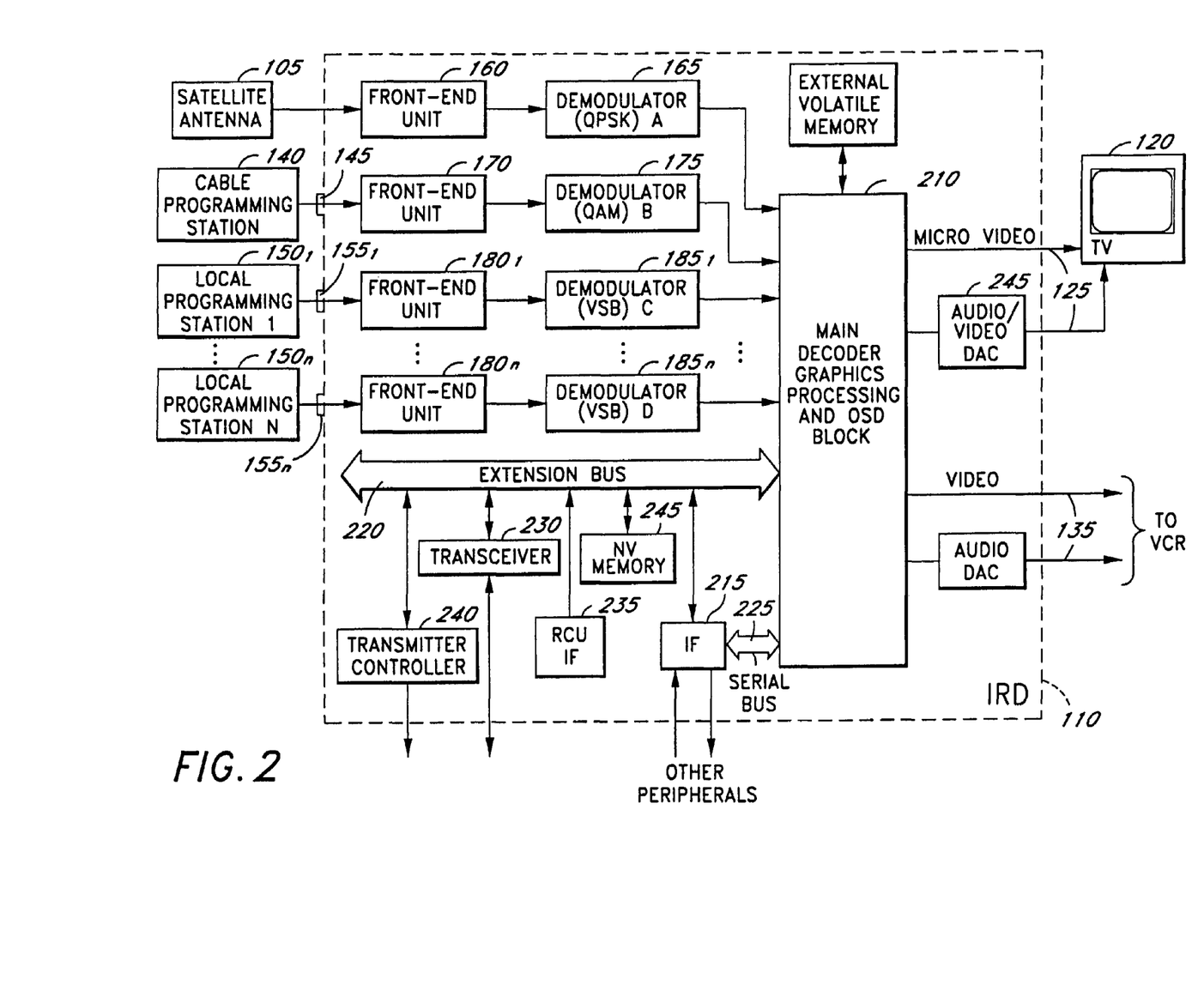
FIG. 2 is a block diagram of one embodiment of an integrated receiver decoder implemented within the entertainment system of FIG. 1.

Referring now to FIG. 2, one embodiment of an integrated receiver decoder (IRD) 110 is shown. The antenna 105 transfers the bit stream to a front-end unit 160 of the IRD 110. Although not shown, the front-end unit 160 includes (i) amplification circuitry used to amplify any relatively weak signals received at antenna 105, and (ii) a tuner which allows a user to receive a desired broadcast channel. The cable programming station 140 transmits digital and/or analog signal via the input port 145 to another front-end unit 170, which similarly includes (i) amplification circuitry used to amplify any relatively weak signals received at input port 145, and (ii) a tuner which allows a user to receive a desired broadcast channel. Similarly, each local programming station $150_1$–$150_n$ transmits digital and/or analog signals via a corresponding input port $155_1$, . . . , $155_n$ to a corresponding front-end unit $180_1$–$180_n$, which similarly includes (i) amplification circuitry used to amplify any relatively weak signals received the corresponding input port $155_1$, . . . , $155_n$, and (ii) a corresponding tuner which allows a user to receive a desired broadcast channel.

In the case where the user wishes to view a show provided by the digital satellite system service provider, the bit stream associated with the desired broadcast channel is routed from front-end unit 160 to a demodulator 165. In demodulator 165, the bit stream is initially processed before transferring to a main decoder, graphics processing and OSD block 210 for further processing. Such initial processing may include exposing the bit stream to QPSK-demodulation, viterbidecoding, de-interleaving and Reed-Solomon decoding, and any other frequency demodulation.

In the case where the user wishes to view a show provided by the cable programming station 140, the digital and/or analog signal associated with the desired broadcast cable channel is routed from the front-end unit 170 to a demodulator 175. In demodulator 175, the analog data is initially processed before transferring to the main decoder, graphics processing and OSD block 210 for further processing as discussed above. Such initial processing may include exposing the bit stream to QAM demodulation and any other amplitude demodulation.

In the case where the user wishes to view a show provided by any of the local programming stations $150_1$–$150_n$, the digital and/or analog signals associated with the desired broadcast local channel are routed from the front-end unit $150_1, \ldots, 150_n$ to the corresponding demodulator $185_1$–$185_n$. In demodulators $185_1$–$185_n$, the digital and/or analog signals are initially processed before transferring to the main decoder, graphics processing and OSD block 210 for further processing as discussed above. Such initial processing may include exposing the bit stream to VSB demodulation and any other phase demodulation.

In certain situations, IRD 110 is connected to other peripheral devices though an interface (IF) 215. In this embodiment, IF 215 may include a link layer integrated circuit (IC) and a physical layer IC (not shown) and complies with the IEEE standards document 1394 entitled "Standard for High Performance Serial Bus" (hereinafter referred to as "IEEE 1394"). This enables IRD 110 to connect to digital-input peripheral devices such as digital VCRs, digital video disk players, digital laser disk players and the like. These digital-input peripheral devices communicate with a central processing unit (CPU) within main decoder, graphics processing and OSD block 210 through IF 215 and either extension bus 220 or alternatively an IEEE 1394 serial bus 225.

Referring still to FIG. 2, extension bus 220 supports input/output (I/O) communications by providing a communication path between electronic circuitry of the main decoder, graphics processing and OSD block 210 and a number I/O related devices. These I/O related devices include a transceiver device 230 (e.g., a modem), a remote command unit interface (RCU-IF) 235, a transmitter controller 240 and an external non-volatile memory element 245 (e.g., read only memory "ROM", flash memory, etc.). RCU-IF 235 receives commands from the remote control (e.g. 115 of FIG. 1), and decodes the commands to produce interrupt request signals (IRQs) corresponding to these commands. Each IRQ is transferred to the CPU within the main decoder, graphics processing and OSD block 210.

Transmitter controller 240 provides a communication mechanism so that IRD 110 is able to communicate with an analog VCR via a remote transmitter 115 when one of the shows is scheduled to experience a timer event such as a timed recording. Otherwise, communications between the transmitter controller 240 and the remote transmitter 115 are disabled. Examples of the remote transmitter 115 may include, but are not limited or restricted to infrared transmitters such as those manufactured and commercially available from Matsushita of Osaka, Japan (referred to as a "VCR mouse"). External non-volatile (NV) memory element 245 is connected to extension bus 220 and contains programming data of shows scheduled to be recorded or to be viewed upon purchase, and software that controls the behavior of the user interface displays based on commands from the remote control as described above and in reference to FIGS. 3 and 4.

Figure 3B:
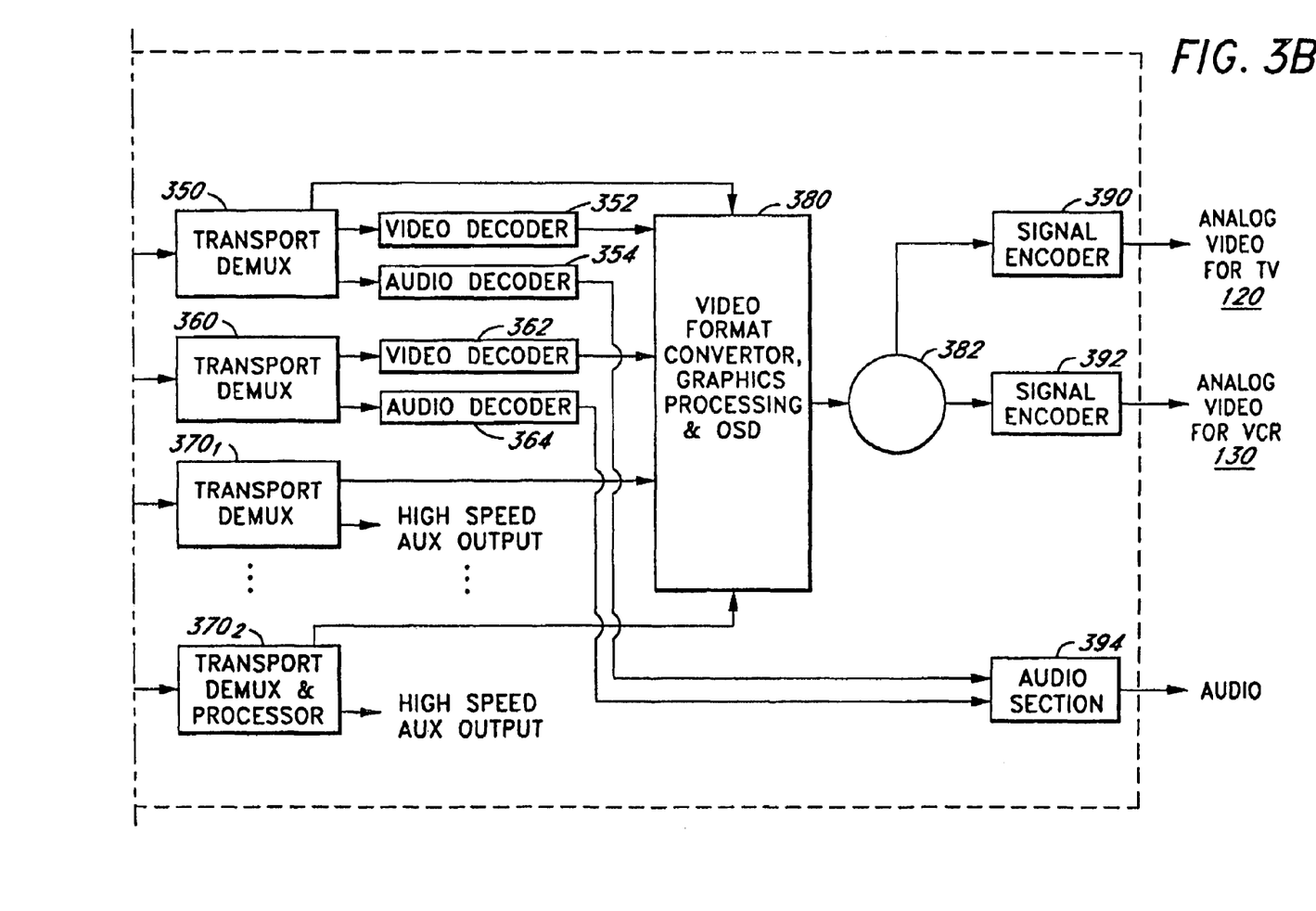

Referring now to FIGS. 3A and 3B, one embodiment of the electronic circuitry within the main decoder, graphics processing and OSD block 210 is shown. A cross switching multiplex unit 300 such as a multiplexed switch, receives the decoded bit stream from demodulator 165, the digital and/or analog signals from demodulator 175, and/or the digital and/or analog signals from demodulators $185_1, \ldots, 185_n$. Depending on commands from the CPU 325, representative of whether viewing of channels broadcast by the satellite system and/or the cable television system and/or one or more of the local programming stations $150_1$–$150_n$, is desired, the switching unit 300 transmits one or more of: the decoded bit stream from demodulator 165 and/or the digital and/or analog signals from demodulator 175 and/or the decoded digital and/or analog signals from demodulator $185_1, \ldots, 185_n$ to the respective Transport Packet Parser (TPP) and filter blocks 302, 306, $310_1$–$310_n$. If a decoded bit stream is transmitted, the TPP in the respective TPP and filter blocks 302, 306, $310_1$–$310_n$ receives the decoded bit stream and parses the bit stream.

If analog data is transmitted, the filter in the respective TPP and filter block 302, 306, $310_1$–$310_n$ filters the analog data. The parsed bit stream or the filtered analog data is decrypted by a respective cryptographic engine 304, 308, $312_1$–$312_n$, which may operate in accordance with a cryptographic function, for example Data Encryption Standard (DES).

CPU 325 controls the operations of the IRD 110 by communicating with a plurality of elements through an internal high-speed bus 330. These elements include an optional volatile memory 335, at least one non-volatile (NV) memory element 340 (e.g., read only memory "ROM", erasable programmable read only memory "EPROM", flash memory, etc.) that contains software programs, extension bus interface 345, and traffic controller 320. NV memory element 340, in lieu of external NV memory 245 of FIG. 2, may be used to store software needed by CPU 325 (e.g., interrupt software) or perhaps timer data. Extension bus interface 345 allows CPU 325 to communicate with the devices coupled to extension bus 220.

Based on commands from the CPU 325, the traffic controller (Tc) 320 provides any one of: (i) the parsed bit stream from demodulator 165 to the transport demultiplexor 350; (ii) the digital and/or analog signals from demodulator 175 to transport demultiplexor 370; (iii) the digital and/or analog signals from demodulator $185_1, \ldots, 185_n$, to a corresponding transport demultiplexor $370_1, \ldots, 370_n$. In one embodiment, the traffic controller 320 may provide, simultaneously, and in any combination, any of the (i) the parsed bit stream from demodulator 165 to the transport demultiplexor 350; (ii) the digital and/or analog signals from demodulator 175 to transport demultiplexor 360; (iii) the digital and/or analog signals from demodulator $185_1, \ldots, 185_n$, to a corresponding transport demultiplexor $370_1, \ldots, 370_n$. That is, the traffic controller 320 may provide broadcast signals from any combination (i.e., two or more) of broadcast sources, e.g., from the antenna 105 (FIG. 1), the cable programming station 140 (FIG. 1), and any one or more of the local programming stations $150_1, \ldots, 150_n$ (FIG. 1). The broadcast signals from the different sources may thereafter be displayed simultaneously on separate screens of a single display (see, for example, FIG. 5). In one embodiment, the broadcast signals from the different sources may be displayed simultaneously while being programmed to be recorded by the VCR 130 (FIG. 1). Alternatively, the broadcast signal from a first source may be displayed on a first screen of the display, while another broadcast signal from a second source may be configured for recording. In this alternative embodiment, the broadcast signals from both sources may be displayed on separate screens on a single display while the broadcast signal from the second source is being recorded. The present invention may be extended to simultaneously providing broadcast signals from more than two different sources, either for simultaneously display, for simultaneous recording or for simultaneously recording and displaying.

The parsed bit stream provided to the transport demultiplexor 350 is demultiplexed and provided to a video decoder 352, an audio decoder 354 and a video format converter, graphics processing and on screen display (OSD) circuit 380. Similarly, the digital and/or analog signals provided to the transport demultiplexor 360 are demultiplexed and the video signals are provided to a video decoder 362, the audio signals are provided to an audio decoder 364 and synchronization signals are provided to the video format converter, graphics processing and OSD circuit 380. The signals provided to any one of the transport demultiplexors $370_1$–$370_n$ are demultiplexed and provided to a corresponding high speed auxiliary output terminal and to the video format converter, graphics processing and OSD circuit 380. The outputs of the audio decoders 354 and 364 are provided to corresponding audio circuits in the audio section 394, which process the audio signals. The processed audio signals are subsequently provided as audio outputs.

The processed video signals from video decoders 352 and 362 are decoded and subsequently provided to the video format converter, graphics processing and OSD circuit 380. The output of the video format converter, graphics processing and OSD circuit 380 are subsequently provided to a splitter 382, which forwards the signals to one of a signal encoder 390 and/or signal encoder 392, in response to commands from the CPU 325. The output of the signal encoder 390 are also analog video signals provided for viewing on TV 120 (FIG. 1) while the output of the signal encoder 392 are analog video signals provided to VCR 130.

Referring to FIGS. 3A & 3B, the operations performed by IRD 110 to support selective display and/or recording of programming data associated with programs from one or more sources are described. Upon receiving the first command from the remote control (e.g., user depressing "guide" button of remote control), RCU-IF 235 transfers a first interrupt request signal (IRQ1), corresponding to the first command, directly to CPU 325 or indirectly through a queuing mechanism (not shown). In response to detecting IRQ1, CPU 325 executes interrupt software contained in external NV memory element 245 (or NV memory element 340) and services IRQ1.

Figure 4:
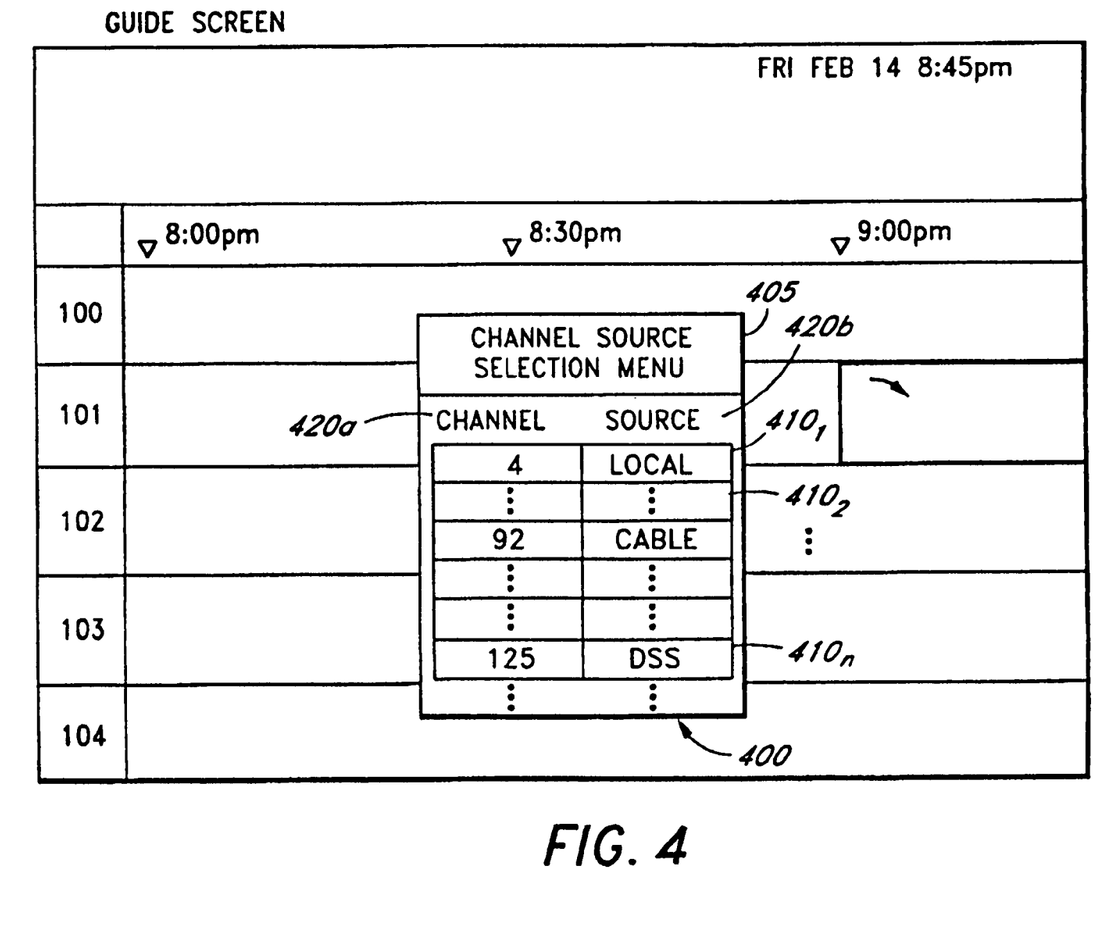
FIG. 4 is one embodiment of a screen menu, shown superimposed over an electronic guide screen, provided for selecting the channel sources for display on a single screen in accordance with the principles of the present invention.

More specifically, in order to service IRQ1, CPU 325 executes interrupt software, normally coded to control the video format converter, graphics processing and OSD logic block 380, to produce an electronic guide screen, such as that shown in FIG. 4. The first operation involves CPU 325 signaling traffic controller 320, via communication line 355, to retrieve at least programming data contained in external volatile memory 315 and route the programming data to graphics processing and OSD logic block 380. Next, CPU 325 controls the video format converter, graphics processing and OSD logic block 350 to decompress the programming data in accordance with a recognized video format and to produce (for display) the electronic guide screen in a manner well-known in the art. In general, the programming data is processed as a bitmap to overlay appropriate grids forming the layout of the electronic guide screen.

The electronic guide screen may be superimposed over video by mixing signals representing the electronic guide screen with video output from video decoder 352 or 362. The video output includes video signals received by main decoder, graphics processing and OSD block 210 and decompressed in accordance with Moving Picture Experts Group (MPEG), Joint Picture Experts Group (JPEG) or any other video decompression function. Alternatively, the electronic guide screen may be superimposed over a still background. In any event, the resulting mixed video output is transferred to signal encoder 390 and/or signal encoder 392. Signal encoders 390 and 392 each convert the mixed video output into an analog signal having a recognized video format such as NTSC, PAL, SECAM and the like (or may go directly to a CRT or other display device in a system which is embodied in a TV receiver).

As the user selects a grid of the electronic guide screen associated with a channel that is provided from a satellite station (e.g., received via antenna 105), the CPU 325 causes the front-end unit 160 to tune to receive and display video of that show as background. Upon RCU-IF 235 receiving a command from the remote control (e.g., user depressing "select" button of the remote control) while the grid of the current-broadcast show is selected, RCU-IF 235 transfers a second interrupt request signal (IRQ2). In response to detecting IRQ2, CPU 325 executes interrupt software and services IRQ2 by signaling the front-end unit 160 to tune to the broadcast channel of the current-broadcast show and to discontinue producing the electronic guide screen.

As the user selects a grid of the electronic guide screen associated with a channel that is provided from the cable programming station 140, the CPU 325 causes the front-end unit 170 to tune to receive and display video of that show as background. Upon RCU-IF 235 receiving a third command from the remote control (e.g., user depressing "select" button of the remote control) while the grid of the current-broadcast show is selected, RCU-IF 235 transfers a third interrupt request signals (IRQ3). In response to detecting IRQ2, CPU 325 executes interrupt software and services IRQ3 by signaling the front-end unit 140 to tune to the broadcast channel of the current-broadcast show and to discontinue producing the electronic guide screen.

As the user selects a grid of the electronic guide screen associated with a channel that is provided from the local programming stations $150_1$–$150_n$, the CPU 325 causes the corresponding front-end unit $180_1$–$180_n$ to tune to receive and display video of that show as background. Upon RCU-IF 235 receiving a fourth command from the remote control (e.g., user depressing "select" button of the remote control) while the grid of the current-broadcast show is selected, RCU-IF 235 transfers a fourth interrupt request signal (IRQ4). In response to detecting IRQ4, CPU 325 executes interrupt software and services IRQ4 by signaling the corresponding front-end unit $180_1$–$180_n$ to tune to the broadcast channel of the current-broadcast show and to discontinue producing the electronic guide screen. Likewise, additional commands may be generated to signal other front end units, $180_1$–$180_n$, to tune to the broadcast channel of choice.

Since the signals received from the different sources, i.e., from each of the satellite station (via antenna 105), the cable programming station 140 and/or the local programming station $150_1$–$150_n$, are separately processed, the user may surf through channels provided from any of the different sources in a seamless manner.

As the user selects a grid of the electronic guide screen associated with a channel that may be provided from more than one source, for example, from a satellite station, a cable station or any of a number of local programming stations, CPU 325 executes the channel source software which displays a channel source selection menu 400 that is superimposed over the electronic guide screen as shown in FIG. 4.

Referring now to FIG. 4, the channel selection menu 400 includes a header 405 and a plurality of option grids 410$_{1-n}$. For example, as shown, the header grid 405 indicates that the user has selected a channel that may be provided from more than one source, e.g., from each of the satellite station (via antenna 105), the cable programming station 140 and/or the local programming station 150$_1$–150$_n$. Each of the option grids 410$_{1-n}$ is divided into two columns 420a and 420b. Column 420a displays the channel numbers and column 420b displays the sources (LOCAL, CABLE or DSS) corresponding to the channel number in column 420a, that may be selected. One of the two sources is highlighted to facilitate user selection. If the highlighted source, e.g., LOCAL, is desired for a particular channel (e.g., channel 4), the user may depress the "select" button on the remote control. If another source is desired, the user may use an arrow button (in this case the right arrow button) to move to the next source (in this case, "CABLE"), which lights up in response. The highlighted CABLE source may be likewise selected. In one embodiment, the user may select the channel sources for any number or all the affected channels (e.g., channels 100–125) using the menu 400 provided as shown in FIG. 4.

The user may select viewing and/or recording of a program from any of the programming sources. Referring to FIGS. 2–4, upon RCU-IF 235 receiving a fifth command from the remote control while the first option grid 410$_1$ is selected, RCU-IF 235 transfers a fifth interrupt request signal (IRQ5). In response to detecting IRQ5, CPU 525 executes interrupt software contained in external NV memory element 245 and services IRQ5. Servicing IRQ5 involves loading channel source selection programming data into memory (e.g., external NV memory element 245) for recording of a program by VCR 130. A first state value will be subsequently loaded into the record parameter of channel source software, which when executed, will direct the switching unit 300 to switch to receive digital data from demodulator 165, or to receive analog data from demodulator 175 or to receive data from demodulators 185$_1$–185$_n$. In addition, servicing IRQ5 causes the CPU 325 to direct either the front end unit 160 to tune to the corresponding station provided by a satellite via antenna 105, or the front end unit 170 to tune to the corresponding station provided by the cable programming station 140, or the front end unit(s) 180$_1$–180$_n$ to tune to the corresponding local programming station(s) 150$_1$–150$_n$.

Figure 5:
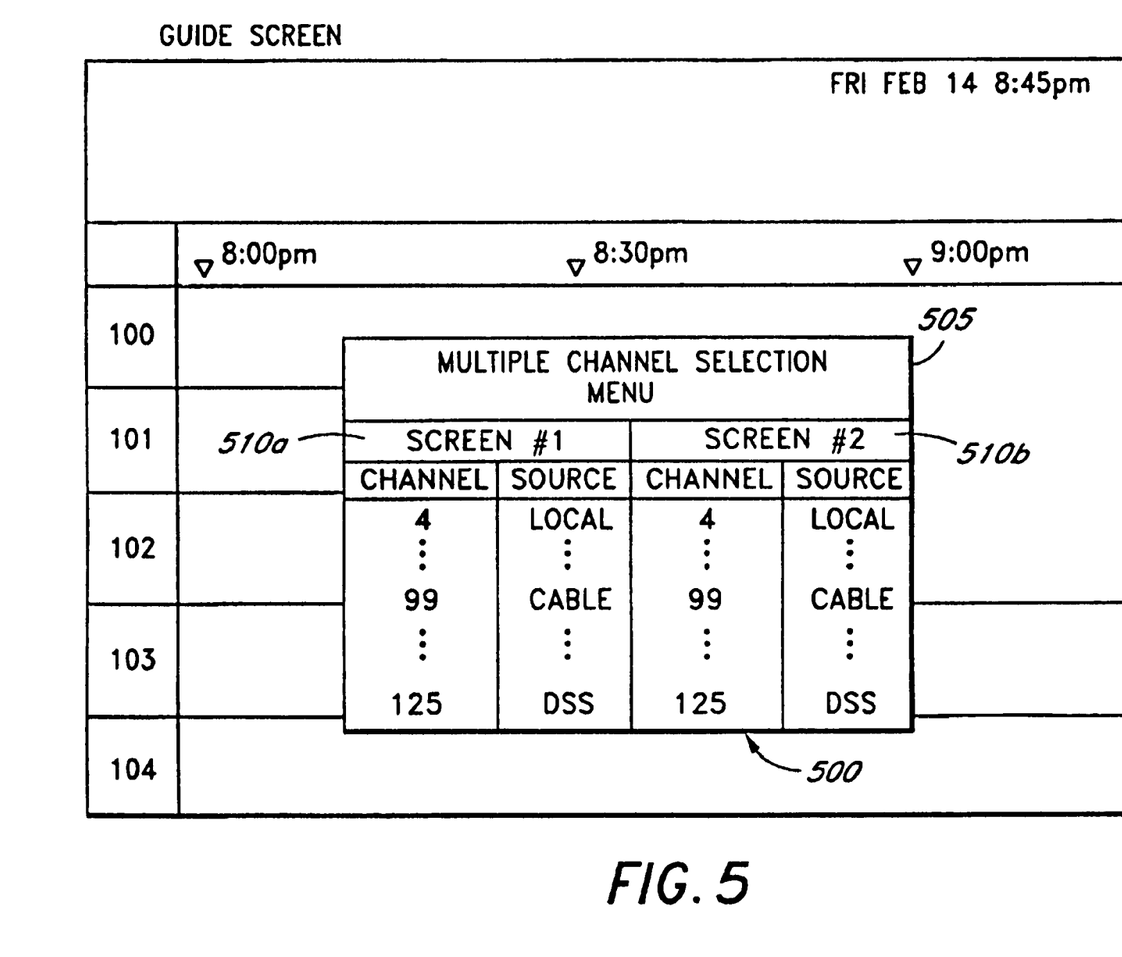
FIG. 5 is one embodiment of a screen menu, shown superimposed over an electronic guide screen, provided for selecting the channel sources for simultaneous display on two screens in accordance with the principles of the present invention.
Figure 6:
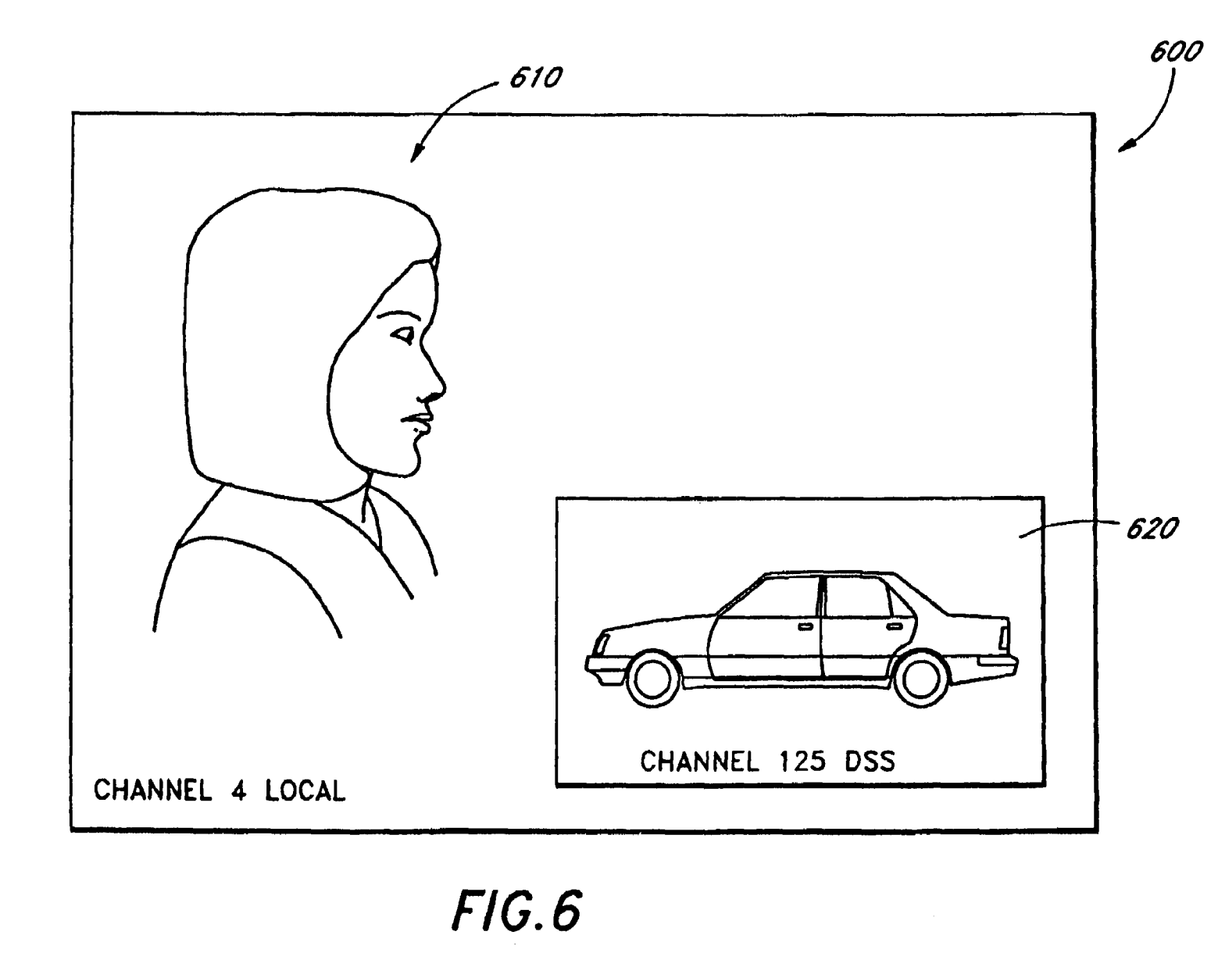
FIG. 6 is one embodiment of a display having two screens, each of which displays a program having a channel source selected in accordance with the principles of the present invention.

The user may also select viewing and/or recording of two or more programs from different sources, simultaneously. In one embodiment, a multiple channel selection menu 500 superimposed over a guide screen, as shown in FIG. 5 is displayed when the viewer desires viewing and/or recording of two or more programs from different sources, simultaneously. The multiple channel selection menu 500 includes a header 505, and two columns 510a and 510b. Column 510a illustrates the channels that may be selected for display on a first screen 610 (FIG. 6) (and/or also for simultaneous recording) and column 510b illustrates the channels that may be selected for display on a second screen 620 (and/or also for simultaneous recording). In one embodiment, each channel for display on the first screen 610 is highlighted, and selection of the channel may be entered by depressing the "Enter" key on the remote transmitter 115. The user may peruse through the programs in any of the channels by using the "Up" or "Down" arrow keys on the transmitter 115. Selection or viewing of the programs for each channel on the second screen 620 may likewise be provided. FIG. 6 is one embodiment of a display 600 such as TV 120 that displays programs from a first source on a first screen 610, and displays programs from a second source on a second screen 620 in a manner as discussed above. As a result, the user may view both programs while recording either or both programs.

The present invention thus provides a method and apparatus for facilitating seamless channel surfing or viewing of programs provided from at least two different sources. The present invention also provides simultaneously viewing and/or recording of programs from two or more different sources. As a result, the consumer's viewing choices are maximized.

The present invention described herein may be designed in many different embodiments and using many different configurations. As discussed herein, the architecture of the IRD is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. A digital integrated receiver decoder comprising:
    a plurality of front-ends, including at least a first front-end and a second front-end;
    said first front-end being configured to receive a first bit stream from a first source and a second front-end being configured to receive a second bit stream from a second source;
    a transport processor coupled to said first front-end and said second front-end, said transport processor being configured to process said first bit stream and said second bit stream and providing a first processed bit stream and a second processed bit stream in response to the first bit stream and the second bit stream respectively; and
    at least one decoder coupled to said transport processor and configured to simultaneously select the first processed bit stream and the second processed bit stream for decoding.

2. The digital integrated receiver decoder of claim 1, wherein
    said transport processor is configured to simultaneously select the first bit stream and the second bit stream for recording.

3. The digital integrated receiver decoder of claim 1, wherein
    said first and second front-ends provide outputs to first and second demodulators, said first and second demodulators each being configured for a different mode of demodulation.

4. The digital integrated receiver decoder of claim 3, wherein
    said integrated receiver decoder comprises more than two front-ends and wherein said transport processor is configured to select first and second front-ends and
    wherein each front-end is associated with a differently modulated form of input signal.

5. The digital integrated receiver decoder of claim 3, wherein
said transport processor is configured to simultaneously select the first bit stream and the second bit stream for recording.

6. A digital television receiver comprising:
a plurality of tuners, including at least a first front-end and a second front-end;
said first front-end being configured to receive a first bit stream from a first source and a second front-end being configured to receive a second bit stream from a second source;
a transport processor coupled to said first front-end and said second front-end, said transport processor being configured to process said first bit stream and said second bit stream and providing a first processed bit stream and a second processed bit stream in response to the first bit stream and the second bit stream respectively; and
at least one decoder coupled to said transport processor and configured to simultaneously select the first processed bit stream and the second processed bit stream for decoding.

7. The digital television receiver of claim 6, wherein
said transport processor is configured to simultaneously select the first bit stream and the second bit stream for recording.

8. The digital television receiver of claim 6, wherein
said first and second front-ends provide outputs to first and second demodulators, said first and second demodulators each being configured for a different mode of demodulation.

9. The digital television receiver of claim 8, wherein
said digital television receiver includes a plurality of front-ends and
wherein said transport processor is configured to select first and second front-ends and wherein each front-end is associated with a differently modulated form of input signal.

10. The digital television receiver of claim 9, wherein
said transport processor is configured to simultaneously select the first bit stream and the second bit stream for recording.

* * * * *